US006579551B1

(12) United States Patent
Theuer et al.

(10) Patent No.: US 6,579,551 B1
(45) Date of Patent: *Jun. 17, 2003

(54) BABY-FOOD COMPOSITIONS CONTAINING EGG YOLK AND METHODS THEREFOR

(75) Inventors: Richard C. Theuer, Raleigh, NC (US); Gerald E. Shaul, Canajoharie, NY (US); Terry L. Rocklin, Fort Plain, NY (US); Mary Beth Cool, Canajoharie, NY (US); Virginia A. San Fanandre, Canajoharie, NY (US)

(73) Assignee: Beech-Nut Nutrition Corporation, St. Louis, MO (US)

( * ) Notice: Subject to any disclaimer, the term of this patent is extended or adjusted under 35 U.S.C. 154(b) by 30 days.

This patent is subject to a terminal disclaimer.

(21) Appl. No.: 09/716,518

(22) Filed: Nov. 20, 2000

Related U.S. Application Data

(63) Continuation-in-part of application No. 09/082,634, filed on May 21, 1998, now Pat. No. 6,149,964.

(51) Int. Cl.[7] ................................................. A21D 4/00
(52) U.S. Cl. ........................ 426/321; 426/614; 426/801
(58) Field of Search ................................ 426/614, 801, 426/321

(56) References Cited

U.S. PATENT DOCUMENTS

| | | | |
|---|---|---|---|
| 4,013,799 A | * 3/1977 | Smalligan et al. | |
| 4,607,052 A | 8/1986 | Mendy et al. | ............... 514/547 |
| 4,670,285 A | * 6/1987 | Clandinin et al. | |
| 4,758,592 A | 7/1988 | Horrobin et al. | ........... 514/549 |
| 4,776,984 A | 10/1988 | Traitler et al. | ........... 260/412.2 |
| 4,795,650 A | 1/1989 | Groobert | ..................... 426/306 |
| 4,918,063 A | 4/1990 | Lichtenberger | ............... 514/78 |
| 4,977,187 A | 12/1990 | Horrobin | ..................... 514/560 |
| 5,053,387 A | 10/1991 | Alexander | ..................... 514/2 |
| 5,120,760 A | 6/1992 | Horrobin | ..................... 514/458 |
| 5,130,449 A | 7/1992 | Lagarde et al. | ............. 554/186 |
| 5,134,129 A | 7/1992 | Lichtenberger | ............... 514/78 |
| 5,158,975 A | 10/1992 | Guichardant et al. | ........ 514/560 |
| 5,178,873 A | 1/1993 | Horrobin et al. | ........... 424/422 |
| 5,215,746 A | 6/1993 | Stolle et al. | ................... 424/92 |
| 5,221,668 A | 6/1993 | Henningfield et al. | ........ 514/23 |
| 5,223,285 A | 6/1993 | DeMichele et al. | ........... 426/72 |
| 5,234,702 A | 8/1993 | Katz et al. | ..................... 426/72 |
| 5,246,717 A | 9/1993 | Garwin | ........................... 426/2 |
| 5,290,573 A | 3/1994 | Holub | ............................. 426/2 |
| 5,308,832 A | 5/1994 | Garleb et al. | .................... 514/2 |
| 5,340,594 A | 8/1994 | Barclay | ......................... 426/49 |
| 5,403,826 A | 4/1995 | Cope et al. | .................... 514/21 |
| 5,415,879 A | 5/1995 | Oh | ................................. 426/2 |
| 5,445,822 A | 8/1995 | Bracco | ....................... 424/401 |
| 5,457,130 A | 10/1995 | Tisdale et al. | ............... 514/560 |
| 5,480,872 A | 1/1996 | Cope et al. | .................... 514/21 |
| 5,492,938 A | 2/1996 | Kyle et al. | ................... 514/786 |
| 5,516,801 A | 5/1996 | Horrobin et al. | ........... 514/560 |
| 5,520,938 A | 5/1996 | Brunnquell | ................. 426/106 |
| 5,603,959 A | 2/1997 | Horrobin et al. | ........... 424/490 |
| 5,604,216 A | 2/1997 | Horrobin | ..................... 514/182 |
| 5,614,244 A | 3/1997 | Heick et al. | ................. 426/582 |
| 5,656,319 A | 8/1997 | Barclay | ....................... 426/574 |
| 5,665,375 A | 9/1997 | Meier et al. | ................. 424/439 |
| 5,670,540 A | 9/1997 | Horrobin et al. | ........... 514/549 |
| 6,149,964 A | * 11/2000 | Theuer et al. | |

FOREIGN PATENT DOCUMENTS

| | | |
|---|---|---|
| EP | 0 443 047 B1 | 8/1991 |
| EP | 0 775 449 A1 | 5/1997 |
| EP | 775449 * | 5/1997 |
| JP | 57-115159 | 7/1982 |
| JP | 59-39258 | 3/1984 |
| JP | 62-120340 | 6/1987 |
| JP | 01-160989 | 6/1989 |
| WO | 89/11521 A1 | 11/1989 |
| WO | 96/00016 A1 | 1/1996 |
| WO | 97/26804 | 7/1997 |

OTHER PUBLICATIONS

Simopoulos et al. "Egg yolk as a source a long–chain polyunsaturated fatty acids in infant feeding" Am. J. Clin. Nutr. 1992. vol. 55. pp. 411–414.*

Ono et al. "Water Activity–Adjusted Enzymatic Partial Hydrolysis of Phospholipids to Concentrate Polyunsaturated Fatty Acids" 1997 JAOC. vol. 74, No. 11. pp. 1415–1417.*

Spock, "Baby And Child Care," Pocket Books, Inc., 1963, pp. 132–133.

Jackson, et al., Am. J. Clin. Nutr. 1989;50:980–2, "Weaning foods cannot replace breast milk as sources of long–chain polyunsaturated fatty acids".

Simopoulos, et al., Am. J. Clin. Nutr. 1992;55:411–4, "Egg yolk as a source of long–chain polyunsaturated fatty acids in infant feeding".

Ono, et al., JAOS, vol. 74, No. 11, 1997, "Water Activity–Adjusted Enzymatic Partial Hydrolysis of Phospholipids to Concentrate Polyunsaturated Fatty Acids".

Auestad et al., Visual Acuity, Erythrocyte Fatty Acid Composition, and Growth in Term Infants Fed Formulas with Long Chain Polyunsaturated Fatty Acids for One Year, *Pediatric Research* 41(1):1–10 (1997).

Biagi et al., The Effect Of Famma–Linolenic Acid On Clinical Status, Red Cell Fatty Acid Composition And Membrane Microviscosity In Infants With Atopic Dermatitis, *Drugs Exptl. Clin Res*. XX(2):77–84 (1994).

(List continued on next page.)

*Primary Examiner*—Anthony J. Weier
(74) *Attorney, Agent, or Firm*—Harness, Dickey & Pierce, P.L.C.

(57) ABSTRACT

Baby-food compositions containing about 5% to about 25% egg-yolk solids and an acidulant in an acceptable, shelf-stable, baby-food preparation is set forth. The acidulant can be an acid, a cultured food substance containing lactic acid or a fruit or vegetable component which contributes acidity to the composition or a combination thereof. Also described are methods for preparing and using the compositions.

25 Claims, No Drawings

OTHER PUBLICATIONS

Birch et al., Breast–Feeding and Optimal Visual Development, *J. Pediatr. Ophthalmol Strabismus* 30:33–38 (1993).

Bjerve et al., Omega–3 fatty acids: essential fatty acids with important biological effects, and serum phospholipid fatty acids as markers of dietary ω3–fatty acid intake, *Am. J. Clin. Nutr.* 57(suppl.):801S–806S (1993).

Bonanome et al., n–3 Fatty acids do not enhance LDL susceptibility to oxidation in hypertriacylglycerolemic hermodialized subjects, *Am. J. Clin. Nutr.* 63:261–266 (1996).

Boschert, Children With ADHD Often Have Sleep Disorders, *Pediatric News* Dec. (1996).

Campbell et al., An Exteral Formula Containing Fish Oil, Indigestible Oligosaccharides, Gum Arabic and Antioxidants Affects Plasma and Colonic Phospholipid Fatty Acid and Prostaglandin Profiles in Pigs, *J. Nutr.* 127:137–145 (1997).

Carlson, Arachidonic Acid Status of Human Infants: Influence of Gestational Age at Birth and Diets with Very Long Chain n–3 and n–6 Fatty Acids, J. Nutr. 126:1092S–1098S (1996).

Carlson et al., Long–chain fatty acids and early visual and cognitive development of preterm infants, *European J. of Clin. Nutrition* 48(suppl. 2):S27–S30 (1994).

Carlson et al., Visual–acuity development in healthy preterm infants: effect of marine–oil supplementation, *Am. J. Clin. Nutr.* 58:35–42 (1993).

Carlson, Functional effects of increasing omega–3 fatty acid intake, *J. Pediatr.* 131:173–5 (1997).

Conquer et al., Supplementation with an Algae Source of Docosahexaenoic Acid Increases (n–3) Fatty Acid Status and Alters Selected Risk Factors for Heart Disease in Vegetarian Subjects, *J. Nutr.* 126:3032–3039 (1996).

Fernandes et al., Role of Omega–3 Fatty Acids in Health and Disease, *Nutrition Research* 13(suppl. 1):S19–S45 (1993).

Gephart, A managed care approach to ADHD, *Contemporary Pediatrics*, 14(5);123–139 (1997).

Herber et al., Dietary Marine Algae Promotes Efficient Deposition of n–3 Fatty Acids for the Production of Enriched Shell Eggs, *Poultry Science* 75:1501–1507 (1996).

Hoffman et al., Effects of supplementation with ω3 long–chain polyunsaturated fatty acids on retinal and cortical development in premature infants, *Am. J. Clin. Nutr.* 57(suppl):807S–812S (1993).

Huang et al., Arachidonate and Docashexaenoate Added to Infant Formula Influence Fatty Acid Composition and Subsequent Eicosanoid Production in Neonatal Pigs, *J. Nutr.* 126:2199–2208 (1996).

Hughes et al., Fish oil supplementation inhibits the expression of major histocompatibility complex class II molecules and adhesion molecules on human monocytes, *Am. J. Clin. Nutr.* 63:267–272 (1996).

Iacono et al., Effects of Polyunsaturated Fats on Blood Pressure, *Annu. Rev. Nutr.* 13:243–260 (1993).

Innis et al., Development of visual acuity in relation to plasma and erythrocyte ω–6 and ω–3 fatty acids in healthy term gestation infants, *Am. J. Clin. Nutr.* 60:347–352 (1994).

Innis et al., Plasma and red blood cell fatty acids of low–birth–weight infants fed their mother's expressed breast milk or preterm–infant formula, *Am. J. Clin. Nutr.* 51:994–1000 (1990).

*Investigative Opthalmology & Visual Science*, 36(4):S369, §3983.

Jensen et al., Effect of dietary linolenic/alpha–linolenic acid ratio on growth and visual function term infants, *J. Pediatr.* 131(2):200–209 (1997).

Jumpsen et al., Small Changes of Dietary (n–6) and (n–3)/Fatty Acid Content Ratio Alter Phosphatidylethanolamine and Phosphatidycholine Fatty Acid Composition During Development of Neuronal and Glial Cells in Rats, *J. Nutr.* 127:724–731 (1997).

Kelley et al., Dietary α–linolenic acid and immunocompetence in humans, *Am. J. Clin. Nutr.* 53:40–46 (1991).

Lagström et al., Nutrient Intakes by Young Children in a Prospective Randomized Trial of a Low Saturated Fat, Low–Cholesterol Diet, *Arch Pediatr. Adolesc. Med.* 151:181–188 (1997).

Luukkainen et al., Impact of Solid Food on Plasma Arachidonic and Docosahexaenoic Acid Status of Term Infants at 8 Months of Age, *J. Pediatr. Gastroenterol. and Nutr.* 23(3):229–234 (1996).

Makrides et al., Fatty acid composition of brain, retina, and erythorocytes in breast– and formula fed infants, *Am. J. Clin. Nutr.* 60:189–194 (1994).

Makrides et al., Erythrocyte Docosahexaenoic Acid Correlates with the Visual Response of Healthy, Term Infants, *Pediatric Research* 33(4):425–427 (1993).

Makrides et al., Are long–chain polyunsaturated fatty acids essential nutrients in infancy? *Lancet* 345:1463–1468 (1995).

Makrides et al., The effect of dietary fat on the developing brain, *J. Paediatr. Child Health* 29:409–410 (1993).

Nair et al., Prevention of Cardiac Arrhythmia by Dietary (n–3) Polyunsaturated Fatty Acids and Their Mechanism of Action, *J. Nutr.* 127:383–393 (1997).

Nettleton, ω–3 Fatty acids: Comparison of plant and seafood sources in human nutrition, *J. American Dietetic Assoc.* 91:331–337 (1991).

Neuringer, Cerebral Cortex Docosahexaenoic Acid is Lower in Formula–Fed Than in Breast–Fed Infants, *Nutrition Reviews* 51(8):238–241.

Palombo et al., Rapid modulation of lung and liver macrophage phospholipid fatty acids in endotoxemic rats by continuous enteral feeding with n–3 and γ–linolenic fatty acids, *Am. J. Clin Nutr.* 63:208–219 (1996).

*Pediatric Research, Program Issue APS–SPR*, vol. 39, #4, Part 2, p. 306A, 1819 (Apr., 1996.

Salem et al., Are ω–3 Fatty Acids Essential Nutrients for Mammals?, *World Rev. Nutr. Diet.* 72:128–147 (1993).

Sanders, Marine oils: metabolic effects and role in human nutrition, *Proceedings of the Nutrition Society* 52:457–472 (1993).

Simopoulos, Summary of the NATO Advanced Research Workshop on Dietary ω3 and ω6 Fatty Acids: Biological Effects and Nutritional Essentiality, *J. Nutr.* 119:521–528 (1989).

Stevens et al., Essential fatty acid metabolism in boys with attention–deficit hyperactivity disorder, *Am. J. Clin. Nutr.* 62:761–768 (1995).

Stevens et al., Omega–3 Fatty Acids in Boys with Behavior, Learning, and Health Problems, *Physiol. Behav.* 59(4/5):915–920 (1996).

*The American Pediatric Society and The Society for Pediatric Research*, Abstracts and Program Outline, p. 310A, 1842 and 1847, May 7–11, 1995.

Uauy–Degach et al. Nutritional Role of Omega–3 Fatty Acids During the Perinatal Period, *Clinics in Perinatology* 22(1):157–175 (1995).

Uauy et al., Safety and efficacy of omega–3 fatty acids in the nutrition of very low birth weight infants: Soy oil and marine oil supplementation of formula, *J. Pediatr.* 124:612–620 (1994).

Uauy et al., Role of Essential Fatty Acids in the Function of the Developing Nervous System, *Lipids* 31:S–167–S–176 (1996).

Uauy, Are ω–3 Fatty Acids Required for Normal Eye and Brain Development in the Human?, *J. Pediatr. Gastroenterol. Nutr.* 11(3):296–301 (1990).

Werkman et al., A Randomized Trial of Visual Attention of Preterm Infants Fed Docosahexaenoic Acid Until Nine Months, *Lipids* 31:91–97 (1996).

Wu et al., Immunologic effects of marine– and plant–derived in n–3 polyunsaturated fatty acids in nonhuman primates, *Am. J. Clin. Nutr.* 63:273–280 (1996).

International Conference on The Return of ω–3 Fatty Acids Into the Food Supply: I. Land–Based Animal Food Products and Their Health Effects, Program and Abstract Book, National Institutes of Health, Sep. 18–19, 1997.

News Release, *American Academy of Pediatrics* Dec. 10, 1996.

\* cited by examiner

BABY-FOOD COMPOSITIONS CONTAINING EGG YOLK AND METHODS THEREFOR

CROSS REFERENCE TO RELATED APPLICATIONS

This application is a continuation-in-part of U.S. patent application Ser. No. 09/082,634 filed May 21, 1998 now U.S. Pat. No. 6,149,964.

BACKGROUND OF THE INVENTION (1) Field of the Invention

This invention relates generally to food compositions and, more particularly, to novel baby-food compositions comprising egg yolk and to methods of making and using the compositions.

(2) Description of the Related Art

Semi-solid baby-food compositions containing egg-yolk solids are currently available commercially in the United States and a number of other compositions not currently available are known to have been available in the past. However, all of these compositions have contained either a small amount of egg-yolk solids, i.e. less than 5%, or a large amount of egg-yolk solids, i.e. about 29% to 30% or more, neither of which is entirely satisfactory as a food source. The compositions containing less than 5% egg-yolk solids do not provide the amount of nutritional components available in the compositions having higher percentages of egg yolk, whereas, baby-food compositions with the higher percentages of egg yolk have had extremely poor taste and, as a result, they are no longer commercially available. Indeed, it is well known that infants typically reject cooked egg yolk, apparently because of its strong taste and gritty, mealy texture. Nevertheless, because egg-yolk solids are known to contain substantial levels of nutrients, there remains a continuing need for a semi-solid baby-food composition containing moderate to high levels of egg-yolk solids in a composition suitable for feeding to babies.

Among the nutrients which can be added to the infant diet in egg-yolk solid are the polyunsaturated fatty acids. One such polyunsaturated fatty acid, the ω-3 fatty acid, docosahexaenoic acid (DHA), has been shown to be a required nutrient for optimal maturation of visual and cortical function in human infants (See, for example, Hoffman et al., *Am. J. Clin. Nutr.* 57(suppl.):8075-12S, 1993; Makrides et al., *Lancet* 345:1463–1468, 1995). Although the minimum dietary amount of DHA required by infants has not been unequivocally established, the Food and Agriculture Organization and World Health Organization recommend 40 mg/kg body weight for preterm infants and 20 mg/kg for term infants (*FAO/WHO Expert Consultation on Fats and Oils in Human Nutrition,* FAO 1994, Rome, pp. 52–55). For term infants this is about 70 mg at birth in about 420 calories and 140 mg at 6 months of age in about 700 calories.

Breast-fed infants receive DHA in their mother's milk, which contains a full-complement of both ω-6 and ω-3 polyunsaturated fatty acids (Hoffman et al, supra; Makrides et al., supra; Innis et al, *Am. J. Clin. Nutr* 60:347–352, 1994). However, the concentration of DHA in breast milk can vary substantially depending upon the amount of preformed DHA from meat and fish in the mother's diet. Id. In addition, many infants are not breast-fed or are breast-fed only for a few weeks and must rely on infant formula and solid baby food for their nutritional requirements.

Current infant formulas available in the United States do not contain DHA (Jensen et al., *J. Pediatr* 131:200–209, 1997). Furthermore, solid foods fed to babies generally have little or no DHA so that the intake of fat from such solid foods does not increase plasma DHA levels as does breast feeding (Luukkainen, supra). Thus, it would be desirable to increase the dietary intake of DHA in babies and one way to accomplish this would be to increase the amount of DHA either in infant formula or in solid baby-food compositions.

Sources of DHA that have been added to infant formula to increase the content of DHA include marine oil, extracted egg-yolk lipids and lipids derived from animal tissue phospholipids (U.S. Pat. No. 4,670,285, Uauy, et al., J Pediatr. 134:612–620, 1994; Makrides et al., supra; Carlson, *J. Nutr.*:126:10925–10985, 1996). However, marine oil tends to have a strong fishy taste and odor and thus is unsuitable for adding to infant formula or solid baby food. In addition, lipids extracted from egg yolk and animal tissue are susceptible to oxidative deterioration. Also, with respect to solid baby-food preparations, production of fish and/or animal oils requires extensive processing, so that the use of such processed oils in a baby-food composition would diverge from the "whole food" and "natural food" concepts of baby food which is popular among caregivers.

One possibly suitable source of DHA that might be incorporated into a solid baby-food preparation is whole egg yolk. Although, hens' eggs ordinarily contain only very low amounts of DHA, hens fed a diet enriched with DHA or DHA precursor can contain about 80 mg/egg yolk or about 10 mg/gram of egg-yolk solids. See Table 1, infra. Such DHA-enriched eggs have been developed as sources of DHA for human consumption (Herber et al., *Poultry Sci* 75:1501–1507, 1996; Oh, U.S. Pat. No. 5,415,879). Nevertheless, this earlier work provided no suggestion as to how such DHA-enriched eggs might be incorporated into an acceptable semi-solid baby-food preparation. Thus, there remains a continuing need for a semi-solid baby-food composition containing egg-yolk solids including egg-yolk solids from eggs enriched with a natural source of DHA, in a composition suitable for feeding to babies.

SUMMARY OF THE INVENTION

Accordingly, the inventors herein have succeeded in discovering how to produce acceptable baby-food composition containing 5 to 25% egg-yolk solids. Because egg yolks contain substantial levels of nutrients such as high quality protein with all of the essential amino acids, many vitamins and minerals, and polyunsaturated fatty acids, the baby-food compositions of the present invention are useful in contributing to the nutritional quality of the infant diet. Furthermore, egg-yolk solids can serve as delivery vehicles for nutrients such as the polyunsaturated fatty acid, DHA, if the eggs are produced by chickens fed diets high in DHA or DHA precursors.

Thus, in one embodiment, the present invention provides a novel baby-food composition containing from about 5% to about 25% egg-yolk solids. In one aspect of this embodiment, the egg-yolk solids are high in DHA content so as to provide nutritionally significant amounts of DHA in the infant diet in only one or two servings. As a result, the baby-food composition, preferably, contains at least 1 mg DHA per gram of the composition. Because the DHA in the baby-food compositions of the present invention is provided by egg yolk rather than by adding refined oils or fats, the compositions are whole food preparations. Furthermore, eggs containing high amounts of DHA have been consumed by humans for a number of years so that one would not anticipate encountering any unexpected adverse effects upon feeding compositions containing the DHA-enriched egg yolks to babies.

The new compositions are in an acceptable baby-food formulation which further comprises an acidulant selected from the group consisting of citric acid, phosphoric acid, vinegar or combinations thereof. As an alternative to or in addition to such acids, the acidulant can be comprised of a cultured food substance containing lactic acid as illustrated below in Examples 11 and 16 or one or more fruit or vegetable components which contribute acidity to the composition as illustrated below in Examples 4, 14, 15 and 16. Moreover, the compositions can contain additional ingredients including a zinc salt, a spice, an additional fruit or vegetable component which contributes organoleptic qualities such as flavor or aroma to the composition and a filler substance, such as starch or flour.

In another embodiment, the present invention comprises a method for increasing the nutritional intake of an infant. The method comprises feeding to the infant, a baby-food composition containing from about 5% to about 25% egg yolk. In one aspect of this embodiment, the composition contains at least 1 mg DHA per gram of the composition. The new compositions are in an acceptable baby-food formulation which further comprises an acidulant selected from the group consisting of citric acid, phosphoric acid, acetic acid or combinations thereof. As an alternative to or in addition to such acids, the acidulant can be comprised of a cultured food substance containing lactic acid as illustrated below in Examples 11 and 16 or one or more fruit or vegetable components which contribute acidity to the composition as illustrated below in Examples 4, 14, 15 and 16. The acidulant or combination of acidulants confers upon the composition of a pH of about 4.6 or less. Moreover, the compositions can contain additional ingredients including a zinc salt, a spice, an additional fruit or vegetable component which contributes organoleptic qualities such as flavor or aroma to the composition and a filler substance such as starch or flour.

The present invention, in still another embodiment, provides a method for preparing a baby-food composition containing egg-yolk solids. The method comprises (a) mixing egg-yolk solids and an aqueous liquid to produce an egg-yolk mixture, (b) coagulating egg-yolk protein in the mixture, and (c) homogenizing the coagulated egg-yolk mixture. The baby-food composition is prepared so that it contains from about 5% to about 25% egg-yolk solids. The method can further comprise adding an acidulant to adjust the pH to a value of about 4.6 or less. Preferably the acidulant is added as part of step (a) or after step (a) and before step (b). The acidulant is one that is acceptable for use in a baby-food formulation such as citric acid, phosphoric acid, vinegar or combinations thereof. As an alternative to or in addition to such acids, the acidulant can be comprised of a cultured food substance containing lactic acid as illustrated below in Examples 11 and 16 or one or more fruit or vegetable components which contribute acidity to the composition as illustrated below in Examples 4, 14, 15 and 16. The method can further comprise independently adding as part of step (a) or at any time thereafter, a zinc salt, a spice, an additional fruit or vegetable component which contributes organoleptic qualities such as flavor or aroma to the composition, a filler substance or a combination thereof.

Among the several advantages achieved by the present invention, therefore, may be noted the provision of a composition and method that can nutritionally enrich the infant diet by incorporating egg-yolk solids in the composition; the provision of compositions and methods that can serve as a source of DHA in the infant diet; the provision of such compositions in an acceptable baby-food formulation that meet applicable regulatory requirements as well as being acceptable to the baby and caregiver; and the provision of a new method for manufacturing a food composition containing egg-yolk solids.

DESCRIPTION OF THE PREFERRED EMBODIMENTS

The present invention is based upon the discovery that a significant amount of egg yolk can be incorporated into acceptable baby-food compositions. The term baby or infant as used herein is intended to mean a child in the first period of life generally considered to be in the age range of from birth to about four years and an acceptable baby-food composition is intended to encompass semi-solid food preparations designed for feeding to such baby or infant and meeting all of the regulatory and organoleptic requirements for such compositions. Although designed as baby-food compositions and referenced as such herein, the compositions within the present invention can, of course, be consumed by other population groups such as by individuals who are sick or those who have special nutritional requirements and, in particular, by geriatric individuals so long as the compositions are in an acceptable baby-food formulation.

The baby-food compositions of the present invention can comprise egg-yolk solids in an amount from about 5% to about 25% egg-yolk solids, more preferably, from about 6% or about 7% to about 25%, even more preferably from about 10% to about 20%, still more preferably, from about 12% to about 18%, even still more preferably from about 14% to about 16% and most preferably, about 15%. The term "about" is intended to included variances of 0.5 percentage values above and below indicated values so that about 15% is intended to mean 14.5% to 15.5%.

The term egg-yolk solids is intended to mean the solids present in natural egg yolk or in dried egg-yolk products such as those commonly used as ingredients in the food industry. The egg-yolk solids can be in the yolk of a whole hen's egg as separated from the shell or in an egg yolk separated from the whole hen's egg or in a purified form in which some or all of the water has been removed from the egg yolk. The amount of solids in egg yolk from hens' eggs and dried egg-yolk products, can be determined using known methods, and are typically about 46% and about 96%, respectively.

As noted above, certain baby-food compositions containing egg yolk are currently commercially available while other baby-food compositions containing egg yolk were available in the past but are no longer available. However, none of these compositions are believed to have contained from about 5% to about 25% egg-yolk solids (see Example 1 below).

In one embodiment, the egg-yolk solids contain high levels of DHA as a result of being produced from eggs laid by hens fed a diet enriched with DHA or DHA precursors such as one containing DHA from marine algae, fish oil or other source of DHA or alpha-linolenic acid from flaxseed or canola or soybean. (see, for example, Herber et al., supra; Oh, supra; Abril et al., *International Conference on The Return of ω-3 Fatty Acids Into the Food Supply: I. Land-Based Animal Food Products and Their Health Effects,* Sep. 18–19, 1997; Scheideler et al., *International Conference on The Return of ω-3 Fatty Acids Into the Food Supply: I. Land-Based Animal Food Products and Their Health*

*Effects,* Sep. 18–19, 1997). Such DHA-enriched eggs are commercially available and their yolk solids can typically contain from about 9 to about 19 mg DHA/g. The amount of DHA in egg-yolk solids can be measured using methods known in the art (see Example 2 below). Preferably, the source of DHA-enriched egg yolk and/or the amount of DHA-enriched egg-yolk solids is selected such that the baby-food composition comprises sufficient DHA to provide the minimum daily recommended amount of about 20 mg/kg/day or about 70 mg for the newborn and about 140 mg for the 6 month infant in one or two servings. For example, a typical jar of commercial baby food for six month infants contains four ounces or 113 grams of baby-food composition. The composition can be prepared to contain 150 mg DHA per 100 g of baby food, which would amount to 165 mg DHA per jar. This amount of DHA could be provided by DHA-enriched egg yolks containing 12 mg of DHA per gram egg-yolk solids and the composition would thus contain 14 grams egg-yolk solids per jar or about 12.5% egg-yolk solids.

The egg yolk containing compositions of the present invention are in acceptable baby-food formulations. The terms acceptable baby-food formulation are used interchangeable herein with the terms acceptable baby-food composition and acceptable baby-food preparation. An acceptable baby-food formulation is one suitable for feeding to a baby and included within the meaning of the terms acceptable baby-food formulation is any regulatory agency requirements for foods intended for consumption by infants. For example, lactic acid and malic acid have been reviewed by the Food and Drug Administration and determined not to be generally recognized as safe for use in baby foods. (see 21 C.F.R. §184.1061, §184.1069). Thus, these acids would not be incorporated into an acceptable baby-food formulation. On the other hand, the use of citric acid and phosphoric acid have been determined to be generally recognized as safe (see 21 C.F.R. §184.1033, §182.1073). Therefore, these acids can be incorporated into an acceptable baby-food formulation.

In addition, an acceptable baby-food formulation is one whose overall combination of organoleptic characteristics, i.e., taste, mouthfeel/texture, odor and color/appearance, is sufficiently satisfactory that the infant will consume the formulation and the caregiver will serve the formulation to the infant. For example, infants are known to display an aversion to bitter tastes at a very early age and to strong flavors such as can be present in some vegetables (Trahms, in *Nutrition in Infancy and Childhood,* Pipes and Trahms, Eds, Mosby, St. Louis, 1993, pp. 181–194; Kajiura et al, *Developmental Psychobiol* 25:375–386; Rosenstein et al., *Child Develop* 59:1555–1568, 1988; Lowenberg, in *Nutrition in Infancy and Childhood,* Pipes and Trahms, Eds, Mosby, St. Louis, 1993, pp. 165–180; Brooks, supra; Lawless, supra; Ashbrook et al, *J Nutrition Ed* 17:5, 6, 46, 1985; Beal *Pediatrics* 20:448–456, 1957). Therefore, an acceptable formulation of a baby-food composition does not have a strong bitter taste or a strong flavor such as can be present in some vegetable preparations.

An acceptable baby-food formulation will also have a texture that is acceptable to the baby. For example, foods that are too dry or gritty are usually unacceptable to infants. In general, acceptable baby-food formulations will be smooth in texture. In addition, younger infants typically prefer food that is soft and homogenous. For older infants, however, a nonhomogenous texture may be desired. Because of such preferences, baby foods are typically produced in different forms, depending on the age of the intended consumer. For example, BEECH-NUT Stage 1 products are intended to be consumed by babies from about three months of age. BEECH-NUT Stage 2 products, which are strained and will pass through a 0.050" orifice, are intended to be consumed by infants from about six months of age. Infants of about nine months of age and older are the intended consumers of BEECH-NUT Stage 3 Junior products, which have chunky components that will pass through a ⅜ inch screen.

Preferably, the desired texture can be achieved using the whole food concept by mixing whole food preparations having the desired texture. The whole food concept involves minimal preparation of food components such as by cleaning, peeling and comminuting the food as distinguished from further processing such as by drying, milling into a flour and/or further refining.

Moreover, the color and appearance of the formulation are such that the infant or the adult caregiver will not reject the formulation. Acceptable colors tend to be light rather than dark. Preferably, acceptable color is achieved using the whole food concept in which food components are added which produce the desired color for the overall mixture. The appearance of the formulation should also be smooth and homogenous.

In addition, the composition should not produce adverse side effects such as acid indigestion, diarrhea, allergic responses or the like.

Testing a baby-food composition for organoleptic acceptability can be readily performed by the skilled artisan using routine methods such as those described in the Examples below. For example, since the adult perception of bitter tastes closely follows that in the infant (Lawless, *J. Am. Diet. Assoc.* 85:577–585, 1985) and since food preferences or aversions of the adult caring for the infant are known to influence which foods are offered to the infant (Trahms, in *Nutrition in Infancy and Childhood,* Pipes and Trahms, Eds, Mosby, St. Louis, 1993, pp. 181–194; Brooks, *The Wall St J,* Dec. 4, 1996 pp A1, A6), it is possible to conduct acceptability testing in adults. Standard testing procedures for sensory evaluation are known in the art including, in particular, a 9-point hedonic scale as described in Example 9 below (see Stone and Sidel in *Sensory Evaluation Practices,* Academic Press, Orlando, 1985, pp 58–86, 227–252). Sensory characteristics which can be tested include appearance and color, flavor, and mouthfeel and texture. Compositions scoring above neutral on a 9-point hedonic scale, i.e. 5.0 or greater, for at least one, more preferably two and most preferably all sensory characteristics of appearance/color, flavor and mouthfeel/texture are considered to be acceptable with respect to those attributes.

Testing for organoleptic acceptability in infants could be conducted, for example, after obtaining informed consent from parents in a double-blind, randomized controlled study. Infants of ages from about 4 months to about 12 months would be fed a series of baby-food compositions prepared containing, for example, 15% egg-yolk solids or a reference baby-food preparation known to be accepted by the infants such as, for example, BEECH-NUT and GERBER vanilla custard pudding products or GERBER cherry vanilla pudding product. The adult feeding the infant would then record acceptability and tolerance including amount offered, amount consumed and amount refused by the babies. Acceptability rating would be performed by methodology known in the art (for example, Stone and Sidel, supra). The results would be analyzed and compositions showing acceptance comparable to or greater than that of the reference baby food would be considered organoleptically suitable for use as an infant food.

The baby-food compositions of the present invention can also contain an aqueous liquid comprising water or a solution containing water. The aqueous liquid is added in an amount that confers a smooth texture on the composition as a whole. Preferred aqueous liquids include water, fruit juices such as apple juice, grape juice, orange juice, and the like and vegetable juices such as carrot juice, beet juice, celery juice, tomato juice and the like. The use of fruit juices and some vegetable juices can also provide a source of sugars for the composition.

Preferred embodiments of the present invention also contain an acidulant. The acidulant improves the texture and/or mouthfeel of the egg yolk containing compositions to produce a smooth texture. Furthermore, the addition of acidulant to achieve a pH of 4.6 or less permits the sterilization of the composition at a temperature of 212° F. rather than at 250° F. temperature required for compositions having a higher pH. This lower retorting temperature not only simplifies the manufacturing procedure, it improves the color of the processed baby-food composition and reduces any heat-induced breakdown of its nutrients compared to retorting at 250° F. temperature required for compositions having a higher pH. The acidulant is, thus, preferably present in an amount sufficient to produce a post-processing pH of 4.6 or less and most preferably in the range of between 4.2 and 4.3.

The acidulant of the present invention can be any acid permitted under applicable regulatory agency rules for use in infant foods. In particular phosphoric acid, citric acid, vinegar, and combinations thereof are suitable for use in an acceptable baby-food preparation. As an alternative to or in addition to such acids, the acidulant can be comprised of a cultured food substance containing lactic acid as illustrated below in Examples 11 and 16 or one or more fruit or vegetable components which contribute acidity to the composition as illustrated below in Examples 4, 14, 15 and 16. Examples of cultured food substances containing lactic acid include, but are not limited to yogurt, sour cream, cottage cheese, sauerkraut and the like. Examples of suitable fruits or vegetables include, but are not limited to apples, pears, pineapples, strawberries, raspberries, elderberries, blueberries, cherries, grapes, peaches, plums apricots, lemons, clementines, grapefruits, oranges, tomatoes, rhubarbs, sorrels, cress and the like. The fruit or vegetable component is preferably in the form of a puree or juice. The term juice as used herein is intended to include juices and concentrates thereof.

The acid should not make the composition organoleptically unacceptable nor should the acid deleteriously affect the infant in any way. Phosphoric acid, although acceptable in many embodiments, is sometimes less desirable for use in a baby-food compositions of the invention because it adds additional phosphorus to the diet as do the egg-yolk solids. Thus the use of phosphoric acid should be in amounts such that the total of phosphorus in the composition as a whole does not result in consumption by the infant exceeding the recommended daily intake for phosphorus of 500 mg. For preparations in which the composition as a whole would provide a daily intake of greater than 500 mg phosphorus because the egg-yolk solids or other components in addition to the phosphoric acid contribute excessive amounts of phosphorus, phosphoric acid would not be an acceptable acidulant.

The acidulant in the form of an added acid can also improve the taste of the composition, particularly, when in combination with a fruit puree or juice in the composition. Thus, the tartness of the acid can tend to provide a balance with fruit components or with added sugar in the composition.

The baby-food compositions of the invention can comprise ingredients which enhance the acceptability of the composition to an infant. For example, fruit(s) and/or vegetable(s), including purees and juices thereof can not only serve as acidulants as noted above, but they can also enhance the acceptability of the composition. As also noted above, the juices can serve to add water as can purees to a lesser extent. Both purees and juices can contribute sugars and additional desirable flavor components to the composition. Examples of suitable fruits that can be incorporated in puree or juice form include apples, pears, bananas, pineapples, strawberries, mangos, papayas and the like. Vegetables which can be incorporated in puree form can include sweet potato, beets, carrots, celery and the like.

Additionally, filler substances such as corn starch, rice flour, wheat flour, nonfat dry milk and the like can be included in the composition as can flavoring agents such as sugars, spices and the like. In particular, cinnamon can be included in the composition.

Other substances can additionally be added to the composition to improve the flavor of the composition. For example, zinc salts such as zinc sulfate or zinc chloride can tend to neutralize the sulfurous odor and taste of cooked egg yolk. In addition, the added zinc can provide a nutritionally significant source of zinc. In addition to zinc, other nutritional supplements such as vitamins and/or minerals can also be incorporated into the composition.

In certain embodiments, coloring agents, processing agents or preservative agents can also be added such as, for example, to improve color, taste, shelf life and the like.

Additional components of baby-food compositions within the scope of the present invention can include, for example, pasta preparations, meat preparations such as turkey or beef, other protein-containing foods and the like.

Preferably, the formulation is based upon a whole food concept such that individual constituents conferring the desired properties on the composition are prepared foods rather than dried and/or refined substances or artificially prepared substances. The whole foods are prepared such as by cleaning, peeling, and comminuting the whole food or part thereof. Examples of whole food components of baby-food compositions are fruit juices which can be used as a natural source of sugars and vegetables such as white carrots which can be used as fillers instead of a starch substance (see, for example, U.S. Pat. No. 5,723,166).

The present invention also provides a method of making the acceptable baby-food compositions described above. The method involves combining the desired quantity of egg-yolk solids, in the form of whole egg yolk or dried egg yolk or the like, with an aqueous liquid and blending to produce a mixture of smooth consistency. The aqueous liquid can be water or any of a number of fruit juices such as, for example, apple juice, grape juice, orange juice, and the like or vegetable juices such as carrot juice, beet juice, celery juice, tomato juice and the like. If dried egg yolks are used, it is necessary to use a sufficient amount of the aqueous liquid component to adequately disperse the egg-yolk solids in the mixture. The amount of egg-yolk solids in the composition as a whole is preferably from about 5% to about 25%, from about 6% or 7% to about 25%, from about 10% to about 20%, from about 12% to about 18%, and most preferably about 15%. The method can further comprise adding an acidulant to adjust the pH to a value of about 4.6 or less. The acidulant can be added to the initial mixture or after the blending the initial mixture. The acidulant is one that is acceptable for use in a baby-food formulation such as citric acid, phosphoric acid, vinegar or combinations thereof. As an alternative to or in addition to such acids, the acidulant can be comprised of a cultured food substance containing lactic acid as illustrated below in Examples 11 and 16 or one or more fruit or vegetable components which contribute acidity to the composition as illustrated below in Examples 4, 14, 15 and 16.

The blending, can be accomplished by manual stirring, a mixing machine, a blender or the like and this step can be performed before or after the addition of any desired additional ingredients. Such blending mixes the ingredients and ultimately produces a composition of smooth consistency.

Where additional ingredients are added to the composition such as a zinc salt, a fruit or vegetable puree or juice, a spice or a filler substance, such additions can be made at the time the egg-yolk solids and aqueous liquid are combined or at any appropriate time thereafter.

The blended egg-yolk mixture is then treated to coagulate the protein in the egg-yolk mixture. This coagulating step can be accomplished by heating the mixture at a temperature, preferably greater than 170° F. and more preferably at least 175° F. Complete coagulation of the egg protein can be ensured by heating at 180° F. to 190° F. for 5 minutes. Alternative methods can also be used to perform the coagulating step such as, for example, by microwaving the mixture.

The coagulated protein is then dispersed by homogenizing the coagulated mixture to a smooth consistency. Such homogenizing can be done, for example by using a blender. The homogenized mixture can then be placed in one or more containers, followed by sealing and heating the containers under conditions suitable for producing a shelf-stable composition. Such conditions can be readily determined by the skilled artisan and typically involve retorting for about 30 minutes at either 212° F., for compositions having a pH of 4.6 or lower, or at 250° F. for compositions having a pH greater than 4.6.

INDUSTRIAL APPLICATION

The baby-food compositions of the present invention have application for use as semi-solid preparations for infants. Because the compositions contain a significant amount of egg-yolk solids, they provide a food naturally rich in protein, vitamins and minerals, as well as containing some polyunsaturated fatty acids. In addition, if the compositions are prepared using eggs yolk solids containing high levels of DHA, the compositions provide nutritionally significant amounts of DHA in the infant's diet, which is beneficial for visual and neural development in the infant.

Preferred embodiments of the invention are described in the following examples. Other embodiments within the scope of the claims herein will be apparent to one skilled in the art from consideration of the specification and the examples that follow or from practice of the invention as disclosed herein.

EXAMPLE 1

This example illustrates commercial baby-food compositions containing less than 5% or more than 25% egg-yolk solids.

The compositions of old and current products were obtained from the following publications: BEECH-NUT Ingredient Listings from 1977–1985; GERBER Ingredients Publ. 55-8 Rev. 477 and Publ. 55-8 Rev. 785 for ingredients and Publ. 55–85 Rev. 185, Publ. 55–90 Rev. 185, Publ. 55–90 Rev. 681 for nutrient values per 100 grams; and BEECH-NUT Nutritive Values & Ingredient Listing, Publ. 1977, Publ. 10/1983.

Calculations below are based upon an egg yolk containing about 46% total solids, i.e., about 8 grams total egg-yolk solids for a typical 17-gram egg yolk and fat constituting approximately 50 to 55% of total egg solids or about 4 grams of fat per average egg yolk.

Two egg-yolk products containing high amounts of egg yolk were commercially available in the 1970's but are no longer marketed. These were the BEECH-NUT and GERBER "Egg Yolks" products.

The BEECH-NUT "Egg Yolks" product contained egg yolks and water for proper consistency and provided, per 100 grams, 194 calories, 9.6 grams of protein, 18.5 grams of fat and 29.9 rams of total egg-yolk solids. This product contained 65 grams egg yolk per 100 g.

The GERBER "Egg Yolks" product contained egg yolks and water necessary for preparation and provided, per 100 grams, 199 calories, 10.2 grams of protein, 17.4 grams of fat and 29.0 grams of total solids, as egg-yolk solids. It is believed that the BEECH-NUT and GERBER Egg Yolk products are no longer marketed because the compositions were organoleptically unacceptable to babies and as a result were not purchased by the adult caregivers.

BEECH-NUT "Cereal Egg Yolks & Bacon" product contained water, farina, smoked bacon, dried egg yolks, modified cornstarch, nonfat dry milk, oat flour and smoked yeast. This product provided, per 100 grams, 86 calories, 2.3 grams of protein, 5.5 grams of fat and 15.3 grams of total solids. The content of egg yolk was 3.5% dried egg yolk which contributed 3.33 grams of egg-yolk solids per 100 grams. GERBER "Cereal Egg Yolk Bacon Dinner" contained water, egg-yolk solids, bacon, nonfat dry milk, rice flour, wheat flour, corn flour and sugar. The product provided, per 100 grams, 66 calories, 2.4 grams of protein, 2.8 grams of fat and 13.3 grams of total solids. The amount of egg-yolk solids present was estimated to be about 3 grams of egg-yolk solids per 100 grams and, in any case, less than 5 grams of egg-yolk solids per 100 grams. This calculation is based upon the presumption that the non-egg ingredients including the bacon contribute in part to the fat content of the composition.

GERBER "Cereal & Egg Yolk" contained water necessary for preparation, nonfat milk, egg yolk, wheat flour, corn flour, modified corn starch, sugar and iodized salt.

This product provided, per 100 grams, 55 calories, 2.3 grams of protein, 1.7 grams of fat and 11.8 grams of total solids. The total fat present is 1.7 grams per 100 grams which would be contributed by less than 4 grams of egg-yolk solids per 100 grams.

GERBER and BEECH-NUT desserts contain egg yolks as an ingredient and a total of 1 gram of fat per 100 grams or less, which indicates less than 2 grams of egg-yolk solids per 100 grams.

EXAMPLE 2

This example illustrates the analytical testing of commercial eggs obtained from hens fed diets enriched with DHA or DHA precursors.

Organic eggs from hens fed a DHA-enriching diet were obtained from The Country Hen, Hubbardstown, Mass. 01452 and from Pilgrim's Pride Corporation, Pittsburg, Tex. 75686. For comparative purposes, commercial dried egg yolks from hens not receiving DHA-enriching diet were also analyzed.

Whole eggs were used for convenience and because egg white does not interfere with analytical testing for fatty acids. Fatty acids are present almost exclusively in the yolk and the egg whites contain only negligible amounts of fat.

Standard AOAC analytical methods were used to quantitatively determine the fatty acid content in the whole eggs and in the dried egg-yolk control. (see Shepard, *Lipid Manual, Methodology Appropriatefor Fatty Acid-Cholesterol Analysis,* U.S. Food an Drug Administration, Div. of Nutrition, Center for Food Safety and Applied Nutrition, 200 "C" St. SW, Washington, D.C. 20204, Sep., 1989; *Official Methods of Analysis of the AOAC,* (1995) 16th Ed., Methods 983.23 locator #45.4.02, 969.33 Locator #41.1.28, 994.15 Locator #41.1.35A, and 996.01; Ratnayaka, *J. AOAC International* 78:783–802, 1995). Briefly the AOAC method used was as follows.

Lipids were extracted and then saponified using alcoholic sodium hydroxide. The fatty acids were then esterified in methanol, with boron trifluoride as catalyst, taken up in heptane and injected on a gas chromatograph with a flame ionization detector. The percentages of individual fatty acid methyl esters were determined from a set of standards containing known concentrations of prepared methyl esters of selected fatty acids. The concentration of each fatty acid methyl ester was calculated as either equivalent triglyceride or fatty acid. Total fatty acids were calculated as the sum of all fatty acids expressed as triglycerides and the value reported as a percentage, i.e., grams per 100 grams of sample. Individual fatty acids were expressed as a percentage of total fatty acids. The analysis was based upon a 2-gram sample and the lowest confidence level for total fatty acids was 0.1% whereas that for individual fatty acids was 0.004%. Results are shown in Table 1.

TABLE 1

|  | Dried Egg Yolk | Country Hen Eggs* | Pilgrim's Pride eggs* |
| --- | --- | --- | --- |
| Edible Weight (g) |  | 51.1 | 58.4 |
| Fatty acids (g/100 g) | 49.44 | 7.3 | 9.4 |
| Fatty acids (g/egg) |  | 4.4 | 5.5 |
| DHA (mg/egg) |  | 89.1 | 112.2 |
| Fatty Acid (% of total fatty acids) |  |  |  |
| myristic ($C_{14:0}$) | 0.38 | 0.38 | 0.38 |
| pentadecanoic ($C_{15:0}$) | ‡ | 0.12 | ‡ |
| palmitic ($C_{16:0}$) | 26.04 | 23.41 | 21.40 |
| margaroleic ($C_{17:0}$) | 0.23 | 0.34 | 0.29 |
| stearic ($C_{18:0}$) | 9.24 | 9.48 | 8.53 |
| palmitoleic ($C_{16:1\omega7}$) | 2.68 | 1.79 | 1.50 |
| margaroleic ($C_{17:1\omega9}$) | 0.17 | ‡ | ‡ |
| elaidic ($C_{18:1\omega9}$) | 0.32 | ‡ | ‡ |
| oleic ($C_{18:1\omega9}$) | 40.61 | 30.0 | 29.63 |
| vaccenic ($C_{18:1\omega7}$) | 1.51 | 1.81 | 1.76 |
| eicosanoic ($C_{20:1\omega9}$) | 0.24 | 0.21 | 0.20 |
| nervonic ($C_{24:1\omega9}$) | ‡ | ‡ | ‡ |
| eicosadienoic ($C_{20:2\omega6}$) | 0.16 | 0.26 | 0.33 |
| linoleic ($C_{18:2\omega6}$) | 12.68 | 22.84 | 27.79 |
| gamma linolenic ($C_{18:3\omega6}$) | 0.10 | ‡ | ‡ |
| homo-gamma-lin ($C_{20:3\omega6}$) | 0.22 | 0.28 | 0.18 |
| arachidonic ($C_{20:4\omega6}$) | 1.76 | 1.28 | 1.42 |
| alpha-linolenic ($C_{18:3\omega3}$) | 0.25 | 1.66 | 2.37 |
| eicosapentaenoic ($C_{20:5\omega3}$) | ‡ | ‡ | 0.17 |
| docosapentaenoic ($C_{22:5\omega3}$) | ‡ | 0.26 | 0.20 |
| docosahexaenoic ($C_{22:6\omega3}$) | 0.40 | 2.05 | 2.04 |
| trans isomers ($C_{18:2}$) | 0.14 | ‡ | ‡ |
| unknown | 2.22 | 2.75 | 1.22 |

*Values are expressed as means (n = 16 for Country Hen eggs and n = 12 for Pilgrim's Pride eggs)
‡ At or below the detection limit of 0.10%

As can be seen in Table 1, eggs from hens fed a DHA-enriching diet had substantially higher levels of docosahexaenoic acid (DHA) than dried egg yolk from hens not fed a DHA-enriching diet.

EXAMPLE 3

This example illustrates the testing for the amount of water and acid needed in an egg-yolk composition suitable for use in a baby-food composition.

Six sample compositions were prepared by dispersing varying amounts of dried egg yolk in water at room temperature. A preliminary test of acid requirements was done by adding white vinegar standardized to 5% acidity to sample 7927E to 20% total volume. The samples were placed in a boiling/simmering water bath for about 20 minutes. The samples with greater amounts of dried egg yolk looked like souffle after cooking. The samples were then blended with a hand blender into a smooth mixture and tasted. The results are shown in Table 2.

TABLE 2

| Sample | Dried Egg yolk (g) | Observations | Total weight (g) |
| --- | --- | --- | --- |
| HK7927A | 15.2 | 99.8 | before cooking: very thin after cooking: very much free fluid. |
| HK7927B | 20.4 | 101.7 | before cooking: very thin after cooking: very loose. |
| HK7927C | 24.4 | 100.0 | before cooking: very thin after cooking: soft form. |
| HK7927D | 30.5 | 99.6 | before cooking: thicker than A, B, or C. after cooking: poor taste, unattractive, no specific dislike except generally distasteful; puffy; texture soft and wet enough to blend. |
| HK7927E | 34.8 + vinegar | 102.9 | before cooking: pretty thick after cooking: puffy, some vinegar taste but otherwise a nice clean taste; a bit thin after stirring, not overly viscous. |
| HK7927F | 34.9 | 99.4 | before cooking: pretty thick after cooking: unpleasant taste, nothing specific except generally offensive egg taste; very dry texture, unusable preparation. |

As can be seen from the table, lowering the pH yielded a better physical and organoleptic result. The two best samples, HK7927D and HK7927E, were further evaluated as described below.

EXAMPLE 4

This example illustrates the effects of combining the egg-yolk preparations of example 3 with a fruit or vegetable puree in the absence or presence of added acid.

Sample HK7927E from Example 3 was mixed with 65 g of applesauce to test an acidified food approach and sample HK7927D was mixed with 67 g of sweet potato puree to test a "low acid" food approach.

The HK7927E sample mixed with applesauce was a much smoother product with less egg taste. The mixture of HK7927D with sweet potato puree did not taste as appealing. These results suggest that adding acid in the form of a fruit puree yields a smoother and better tasting composition.

EXAMPLE 5

This example illustrates the effects of adding varying quantities of vinegar to egg-yolk preparations on pH and physical and organoleptic qualities of the composition.

Twenty grams of dried egg yolk were dispersed in 80 g of water containing 0 to 12.2 grams of white vinegar standardized to 5% acidity. The dispersions were then placed in sealed glass jars in a boiling/simmering water bath for 20 minutes. After cooling, the taste, tartness, texture and mouthfeel were evaluated. The preparations were then filtered through filter paper to get a clearer fluid for pH measurement. The pH was measured with a portable pH meter. The pH values in this example only were corrected for measurement bias using readings obtained from pH 7.01 and pH 4.01 standards so that reported values should be considered indicative rather than precisely accurate. The pH and sensory observations are shown in Table 3.

TABLE 3

| Sample | Vinegar (g) | pH | Observations |
| --- | --- | --- | --- |
| HK7928A | 0.0 | 6.26 | Loose scrambled eggs; lots of clear filtrate; little mealy, dry, gritty; no acidity. |
| HK7928B | 3.4 | 4.85 | Creamier than 7928A; slight mealy mouthfeel; no acidity; mildest taste. |
| HK7928C | 6.7 | 4.40 | Very creamy; smooth; slight vinegary but good taste. |
| HK7928D | 9.1 | 4.30 | Not as creamy, strong vinegar taste, too much. |
| HK7928E | 12.2 | 4.17 | Too strong a vinegar taste, very thin, creamy. |

It was concluded that HK7928C was the best of the compositions in this example because it had a smooth, creamy mouthfeel, an acceptable taste and a pH less than 4.6. These results suggested that the optimal acid content when using acetic acid at 5% acidity was 6.7 g per 20 g of dried egg yolk. This calculates to be 1.675 grams of 100% acetic acid per 100 g dried egg yolk, or 28 mEq. This same amount of acid calculated in mEq for citric acid monohydrate, would be about 2 grams citric acid monohydrate per 100 g dried egg yolk.

EXAMPLE 6

This example illustrates the use of fruit puree to increase the amount of egg yolk that can be incorporated into the food composition and to decrease the amount of added water.

In order to obtain a composition with a higher percentage of egg yolk, 398.2 g of dried egg yolk, 129.5 g of vinegar and 601.1 g of applesauce were combined (dried egg yolk= 35.3% of the mixture). The resultant mixture was, however, too thick to get any dispersion of the dried egg yolk into the fluid ingredients. Water was, therefore, added in graded portions until about 550 g were added (dried egg yolk= 23.7% of the mixture). The ingredients could then be blended into a homogeneous mixture. When this was cooked at 175° F. to 180° F. for about 20 minutes, the mixture became very thick.

Samples of this mixture were transferred to glass jars and cooked in a boiling/simmering water bath for 30 minutes. The resulting food, coded HK7001A, was very thick and dry; it was not a puree; and it was judged to be less desirable than formulations in examples 3–5 using lesser amounts of egg-yolk solids.

A 500 g portion of the mixture was combined with an additional 100 g of applesauce (dried egg yolk=19.8% of the mixture), blended for homogeneity and samples placed in glass jars and cooked in a boiling/simmering water bath for 30 minutes. The resulting food, coded HK7001B, was still thick and pasty, but was showing a more appealing flavor and texture. Thus, in order to use the addition of fruit to achieve a more appealing flavor, it is preferable to keep the egg-yolk solids at 20% or less.

Examples 3–6 show that an acceptable approach for preparing a composition containing egg yolk requires having enough water and acid in the initial mixture to disperse the dried egg yolks upon blending; blending the mixture to get a smooth dispersion with no lumps; coagulating the egg yolk by cooking the acidified egg-yolk dispersion at a temperature greater than 170° F. (perhaps greater than 175° F.); and blending the heated dispersion containing the coagulated egg yolk to make a smooth dispersion prior to the final sterilization. Optionally, fruit can be added to improve the flavor.

EXAMPLE 7

This example illustrates a two-phase process for preparing a composition containing 13% dried egg yolks (equivalent to 27% whole egg yolks) and fruit.

Using egg yolks containing 12 mg DHA per gram egg-yolk solids, a baby-food preparation containing about 13% dried egg yolk in a 113-gram (4-ounce) jar of a baby-food preparation will provide 150 mg of DHA in 100 grams of baby food. The following process was, therefore, designed to prepare a baby-food composition containing 13% dried egg yolk.

This process involved mixing about 35% dried egg yolks with citric acid monohydrate and then heating the mixture to greater than 175° F. (80° C.) to denature, i.e. coagulate, the egg-yolk protein (Phase I). This phase I composition was then mixed with various fruit purees and the resulting organoleptic characteristics assessed.

For the first phase, a master batch of the Phase I Egg-Yolk Preparation was prepared with 400 g of dried egg yolks, 8 g of citric acid and 730 g of water. The water was added to a large stainless steel bowl. The citric acid was dissolved in the water and then the dried egg yolks were added. The larger lumps of egg were broken up with a spoon and then the mixture was made into a smooth homogeneous dispersion with a BRAUN MULTIMIXER blender. The dried egg-yolk level was 35.15% of the Phase I Egg-Yolk Preparation.

The bowl was then placed atop a pot with boiling water as a double boiler. The temperature of the egg-yolk dispersion was brought to 175° F. to 185° F. The dispersion became thick with this heating, so it was blended several times to disperse the coagulated egg. The egg in contact with the hot surface of the bowl was more prone to coagulate due to the higher local temperature.

The dispersion lost about 58 g of water due to evaporation, which was replaced after the dispersion was removed from the heat and then blended into the dispersion. Afterwards, one sample was placed in a glass jar, sealed and cooked in a boiling water bath for 30 minutes. The remaining Phase I dispersion was refrigerated and held for blending in Phase II.

For phase II, BEECH-NUT baby fruit puree heated to 150° F., 315 g, was blended with 185 g of the Phase I Egg-Yolk Preparation, to yield 13.0% dried egg yolk in the mixtures. Samples were placed in glass jars, sealed and heated in a boiling/simmering bath for 30 to 35 minutes. The three samples produced were as follows:

TABLE 4

| Sample | PH | Fruit Puree Source | BEECH-NUT Product Code |
| --- | --- | --- | --- |
| HK7005A | 4.19 | BEECH-NUT Stage 3 Pears | 6806C1103 |
| HK7005B | 4.15 | BEECH-NUT Stage 2 Peaches & Bananas | 7611C1102 |
| UK7005C | 4.02 | BEECH-NUT Stage 2 Pears & Raspberries | 7616E1522/24 |

Three jars of each sample were submitted for taste testing. As shown in Table 5, the preparations were reported to taste sour and to be not very palatable.

TABLE 5

| Sample | Flavor Evaluation | | |
|---|---|---|---|
| HK7005A | 3 - not good | 1 - okay | 1 - "funny taste" |
| HK7005B | 4 - okay | 1 - not good | |
| HK7005C | 4 - not good | 1 - okay | |

EXAMPLE 7

This example illustrates the preparation of a low-acid egg-yolk composition using sweet potato puree.

The composition in this example (HK7026) was prepared using the following components in the percentages given as volume percent: sweet potato puree, 55% (BEECH-NUT Stage 3 Sweet Potatoes, 7313B0755); dried egg yolks, 15%; heavy cream, 5% (40% fat; ingredients milk and cream); ground cinnamon, 0.1%; and water, 24.9% (warm, about 120 degrees). The water, heavy cream, warmed sweet potato puree, and cinnamon were combined in a blender bowl and the dried egg yolk was added. The mixture was blended and the egg yolk was easily dispersed in one minute.

The mixture was then transferred to a double boiler and heated to 180° F. with stirring. The coagulated material was then blended to produce a fine dispersion which was readily achieved. The puree was transferred to small Mason jars and retorted for 60 minutes at 15 psig using a home pressure cooker.

The resultant puree had a dried-out, curdled appearance suggesting that it may have lost some liquid in the pressure cooking process. It is possible that a lower level of heavy cream such as 2.5% could diminish the apparent drying out of the puree. The combination of heating in the home pressure cooker and air entrapment in the purees resulted in textures that were undesirable in appearance. The pH after processing was 5.41.

The process was replicated in a pilot plant, however, again the product appeared curdled and undesirable in appearance in the jar. Because in previous work, adding zinc salt reduced the sulfurous odor and taste of cooked egg yolk, zinc chloride was added to the composition prepared in the pilot plant. As a result the pilot plant preparation had no egg-like taste or smell.

EXAMPLE 8

This example illustrates the effects of adding the acidulant, phosphoric acid, on organoleptic properties of the composition.

Four test kitchen samples were prepared containing 15% dried egg yolks, 6% medium grain rice flour and 0.011% zinc chloride and the effect of step-wise addition of phosphoric acid acidulant on product appearance and taste was assessed. The ingredients were combined with water and blended to a smooth consistency, the pH was adjusted with phosphoric acid to the appropriate pH between 6.15 and 4.15 and the mixture heated to 190° F. to coagulate the egg protein. The mixture was then blended again to a smooth consistency and retorted for 50 min at 250° F. for preparations having a pH greater than 4.6 and at 212° F. for preparations having a pH less than 4.6. The samples were tested for titratable acidity (post processing), pH (before and after processing) and for color using a Hunterlab colorimeter. The Hunterlab colorimeter quantitated reflectance on an L, a, and b coordinate system. The L coordinate axis measured lightedness on a scale increasing from darkness-to-lightness; the a axis measured increasing values on a continuum from green to red; and the b axis measured increasing values on a continuum from blue to yellow. The results are shown in Table 6.

TABLE 6

| | TK141A | TK141B | TK141C | TK141D |
|---|---|---|---|---|
| Dried Egg Yolk, % | 15.00 | 15.00 | 15.00 | 15.00 |
| Rice Flour, % | 6.00 | 6.00 | 6.00 | 6.00 |
| Acid added | none | phosphoric | phosphoric | phosphoric |
| Acid added % | 0.00 | 0.12 | 0.19 | 0.38 |
| Titratable acidity, % | 0.082 | 0.250 | 0.329 | 0.534 |
| Unprocessed pH | 6.15 | 5.10 | 4.70 | 4.15 |
| Processed pH | 5.93 | 5.13 | 4.75 | 4.25 |
| Retort temperature, ° F. | 250 | 250 | 250 | 212 |
| Hunterlab "L" | 63.79 | 66.78 | 68.82 | 78.71 |
| Hunterlab "a" | 3.79 | 5.06 | 4.59 | 0.28 |
| Hunterlab "b" | 23.10 | 24.76 | 24.39 | 23.35 |

Sample TK141D had the lightest color (highest Hunterlab L value), probably because of the lower retorting temperature of 212° F.

Samples TK141B, TK141C and TK141D were found to have a smoother texture than sample TK 141A. The samples were then tested for organoleptic acceptability. The observations are summarized below.

Sensory Evaluation

TK141A

Appearance in the jar (unopened): heavily curdled, water separation, starch separated, hard plug, dark, and starch gel surrounds plug Appearance on opening: slimy look on top, plug shrunken away from glass Odor/smell upon opening: slight cooked egg odor Appearance on mixing: looks terrible, starch glistening, darkish Mouthfeel: slightly gritty (better than it looked but well-stirred)

Taste: bland, slight cooked egg taste

TK141B

Appearance in the jar (unopened): finer curd, softer plug, sloppy starch glop at bottom, slightly lighter Appearance on opening: curdled top, grainy surface Odor/smell upon opening: cooked egg odor Appearance on mixing: very curdled and grainy, not attractive, lighter color than A.

Mouthfeel: grainy, particles softer then A

Taste: bland, cooked egg taste

TK141C

Appearance in the jar (unopened): much finer curd, yellow, less dark, and some starch separation, water separation, soft plug Appearance on opening: nice yellow color, egg salad textural appearance, flows like baby food, soft plug Odor/smell upon opening: slight cooked egg odor Appearance on mixing: grainy, starch gel pieces Mouthfeel: soft, smooth despite visual appearance of lumps Taste: slightly tart, not bad

TK141D

Appearance in the jar (unopened): light yellow (great color), looks like some air bubbles with no obvious curd, no water or starch separation Appearance on opening: skin on top, creamy color (more white/less yellow)

Odor/smell upon opening: very slight cooked egg odor

Appearance on mixing: viscous, very thick, grainy, not bad

Mouthfeel: very smooth

Taste: moderately tart, not bad

It was concluded from this experiment that acidification improves mouthfeel and appearance, in particular, the color of the composition. Reducing the pH to less than pH 4.6 permitted retorting at 212° F. in the sterilization process and this is apparently why the color of TK141D was much lighter than the other preparations as indicated by the higher Hunterlab L value.

EXAMPLE 9

The following example illustrates the comparison of three food acid acidulants, phosphoric acid, citric acid and vinegar, which are generally recognized as safe for use in baby-food preparations by the U.S. Food and Drug Administration.

Except for the acidulant, compositions were prepared according to the formulations in Example 8 to contain 15% dried egg yolks, 6% medium grain rice flour and 0.011% zinc chloride. The acidulants used were 85% phosphoric acid, citric acid monohydrate or vinegar standardized to 5% acidity. The pH of the compositions was adjusted to approximately pH 4.15. The ingredients were combined with water and blended to a smooth consistency, the pH was adjusted to pH 4.15 to 4.20 with the appropriate acid and the mixture was heated to 180° F. for 5 minutes to coagulate the egg protein. The mixtures were then blended again to a smooth consistency and retorted at 212° F. for 50 minutes.

Experimental samples were evaluated for flavor and mouthfeel/texture on a standard nine-point hedonic scale. The scale is as follows:

| Score/rating | Std. Hedonic Scale |
| --- | --- |
| 9 | I like extremely |
| 8 | I like very much |
| 7 | I like moderately |
| 6 | I like slightly |
| 5 | I neither like nor dislike |
| 4 | I dislike slightly |
| 3 | I dislike moderately |
| 2 | I dislike very much |
| 1 | I dislike extremely |

The results are shown in Table 7.

TABLE 7

|  | TK141D | TK159A | TK159B | TK159C |
| --- | --- | --- | --- | --- |
| Dried Egg Yolk, % | 15.00 | 15.00 | 15.00 | 15.00 |
| Rice Flour, % | 6.00 | 6.00 | 6.00 | 6.00 |
| Acid added | phosphoric | phosphoric | citric | vinegar |
| Acid added, % | 0.38 | 0.37 | 0.39 | 10.64 |
| Unprocessed pH | 4.15 | 4.16 | 4.15 | 4.17 |
| Processed pH | 4.25 | 4.28 | 4.25 | 4.27 |
| Retort temperature, ° F. | 212 | 212 | 212 | 212 |
| Hunterlab "L" | 78.71 | 74.75 | 74.06 | 76.55 |
| Hunterlab "a" | 0.28 | 1.08 | 1.10 | 0.81 |
| Hunterlab "b" | 23.35 | 23.87 | 25.16 | 23.47 |
| Flavor (nine-point scale) | 2.05 | 2.89 | 2.44 | 1.22 |
| Mouthfeel/Texture (nine-point scale) | 3.84 | 5.66 | 6.67 | 6.33 |

As shown in the table, TK159C, made with white vinegar, had the worst taste. Phosphoric acid and citric acid were roughly similar on taste and citric acid may be slightly better for mouthfeel. Samples made with all three acids, which were retorted at 212° F., had good light yellow colors.

Although sample TK159A containing phosphoric acid was most acceptable on taste, citric acid is preferred for use as the acidulant rather than phosphoric acid. TK141D contained 0.38% phosphoric acid and TK159A contained 0.37% phosphoric acid. Since 85% phosphoric acid contains about 26% phosphorus, these two samples would contain about 112 milligrams of added phosphorus in a four-ounce jar (0.38%=380 mg %; 380 mg/100 g×113 g×0.26% P=112 mg P/jar). Egg yolks already contain about 100 milligrams of phosphorus per medium egg yolk, which weighs 17g. A 15% dried egg-yolk composition contains the equivalent of 30% liquid egg yolk, or 33.9 g (two egg yolks) per four-ounce (113 gram) jar, which supply 200 mg of phosphorus just from the two egg yolks. The recommended daily intake (RDI) for phosphorus for the infant is 500 mg, so a food acidified with phosphoric acid would provide 60% of the recommended daily intake ("RDI") of phosphorus. Food acidified with any other acid would still provide 40% of the phosphorus RDI, derived from the egg yolk alone.

EXAMPLE 10

This example illustrates the effect of retort temperature and sugar content on the organoleptic properties of compositions.

Except for the acidulant used, compositions were prepared according to the formulations in Example 8 to contain 15% dried egg yolks, 6% medium grain rice flour and 0.011% zinc chloride. Where required, citric acid was used to adjust to pH and table sugar was added at 9%. The ingredients were combined with water and blended to a smooth consistency, the pH was adjusted with citric acid monohydrate to pH 4.15 to 4.20 as appropriate and the mixture was heated to 180° F. for 5 minutes to coagulate the egg protein, blended again to a smooth consistency and retorted for 50 minutes at either 250° F. or 212° F. In order to assess the effect of temperature on the compositions, TK162B and TK159B, which were otherwise equivalent preparations, were retorted at 250° F. and 212° F., respectively. Because the pH of the composition determines the required retort temperature, i.e., compositions having a pH greater 4.6 need to be retorted at 250° F. and compositions having a pH of 4.6 or less need only to be retorted at 212° F., reference composition TK141A having pH of about 6 was compared to composition TK162B in order to compare the effect of added acid and retort temperature on organoleptic characteristics of the composition. Finally, composition TK162C was prepared in the same manner as TK159B except that 9% sugar was added to test the effect on organoleptic characteristics of the composition. The results are shown in Table 8.

TABLE 8

|  | TK141D | TK162B | TK159B | TK162C |
| --- | --- | --- | --- | --- |
| Dried Egg Yolk, % | 15.00 | 15.00 | 15.00 | 15.00 |
| Rice Flour, % | 6.00 | 6.00 | 6.00 | 6.00 |
| Sugar, % | none | none | none | 9.00 |
| Acid added, % | none | citric (0.38) | citric (0.39) | citric (0.38) |

TABLE 8-continued

|  | TK141D | TK162B | TK159B | TK162C |
|---|---|---|---|---|
| Unprocessed pH | 6.15 | 4.15 | 4.15 | 4.15 |
| Processed pH | 5.93 | 4.25 | 4.25 | 4.25 |
| Retort temperature, °F. | 250 | 250 | 212 | 212 |
| Hunterlab "L" | 63.79 | 68.65 | 74.06 | 73.11 |
| Hunterlab "a" | 3.79 | 4.87 | 1.10 | 1.71 |
| Hunterlab "b" | 23.10 | 24.80 | 25.16 | 25.32 |
| Flavor (nine-point scale) | 3.84 | 1.95 | 2.44 | 4.86 |
| Mouthfeel/Texture (nine-point scale) | 4.53 | 4.00 | 6.67 | 6.64 |

The results from these compositions show that acidifying the composition detracts from flavor by introducing a strong tartness but enhances color retention, even when the acidified sample is retorted at 250 F. Retorting at a lower temperature is most favorable for maintaining a light color, i.e., higher Hunterlab "L" values. Processing at a lower temperature also favors a better mouthfeel and texture. The experiment above further showed that flavor can be improved by adding sugar to balance the added acid. The 9% sugar level in this model system yielded a relatively neutral flavor score of 4.86.

EXAMPLE 11

This example illustrates baby-food compositions containing 15% dried egg yolk, citric acid monohydrate as acidulant, zinc chloride and various fruit purees or juices as sugar sources.

The compositions in this example were prepared essentially as described above in examples 3–10 which was, briefly, as follows. All ingredients except the citric acid were combined and blended together. The pH was then determined and adjusted to pH 4.25 or less with citric acid. The mixture was then transferred to a double boiler and heated to 170° F. to 180° F. to coagulate the egg protein. The hot mixture was then blended again until smooth and then filled at 150° F. into glass jars which were capped and processed for 50 to 55 minutes at the indicated temperature. The compositions were as shown in Table 9.

Composition TK 153C was judged the best on flavor, which is probably due to the additional cinnamon flavor notes which effectively neutralized the cooked egg-yolk flavors.

EXAMPLE 12

This example illustrates further testing of composition, TK153C for organoleptic acceptability.

TK153C was prepared as described in Example 11 and coded as TK163 for organoleptic analysis by a trained panel of 22 panelists using a nine-point hedonic scale as described in Example 9. TK163 was evaluated for appearance/color, flavor and mouthfeel/texture on a nine-point scale hedonic scale. The results are shown in Table 9 below.

TABLE 10

| Attribute | Mean Value |
|---|---|
| Appearance/Color | 5.95 |
| Flavor | 5.95 |
| Mouthfeel/Texture | 6.23 |

Since the average hedonic score was above neutral for each of the three tested organoleptic characteristics, sample TK163 was deemed to be an organoleptically acceptable baby-food preparation containing 15% dried egg yolk.

EXAMPLE 13

This example illustrates a testing procedure that could be used to determine the organoleptic acceptability of baby-food composition to infants.

Informed consent would be obtained from the parents of the infants involved in the study. Testing would be in a double-blind, randomized controlled study. Approximately 10 full-term infants of ages from about 4 months to about 12 months would be fed a series of baby-food composition including a composition containing egg yolk and a control standard baby food composition known to be accepted by infants. This control composition will serve as a reference for organoleptic acceptability. The baby-food compositions can be prepared, for example, by the methods identified in Examples 3–12 above.

General data on the infants would be obtained and recorded such as age and weight. In addition, background

TABLE 9

|  | TK152 | TK153A | TK153B | TK153C | K154B | K154C | K155 |
|---|---|---|---|---|---|---|---|
| Dried Egg Yolk, % | 15.0 | 15.0 | 15.0 | 15.0 | 15.0 | 15.0 | 15.0 |
| Apple Puree |  | 55.0 | 58.0 | 55.0 |  |  | 25.0 |
| Pear puree |  |  |  |  | 57.0 | 59.0 |  |
| Sweet Potato puree |  |  |  |  |  |  | 25.0 |
| Yogurt | 25.0 |  |  |  |  |  | 15.0 |
| Grape jc. Conc. | 10.0 |  |  |  | 5.0 | 3.0 |  |
| Apple jc. Conc. |  | 7.0 | 7.0 | 7.0 |  |  | 10.0 |
| Rice flour, med. grain | 3.0 | 3.0 |  | 3.0 | 3.0 | 3.0 | 3.0 |
| Cinnamon |  |  |  | 0.045 |  |  |  |
| Zinc chloride | 0.011 | 0.011 | 0.011 | 0.011 | 0.011 | 0.011 | 0.011 |
| Citric acid to: | pH 4.23 | pH 4.23 | pH 4.26 | pH 4.26 | pH 4.24 | pH 4.23 | pH 4.25 |
| Water | q.s. 100 | q.s. 100 | q.s. 100 | q.s. 100 | q.s. 100 | q.s. 100 | q.s. 100 |
| Retort temp, °F. | 250° F. | 212° F. | 212° F. | 212° F. | 212° F. | 212° F. | 212° F. |
| Titratable acid,% |  | 0.414 | 0.437 | 0.560 | 0.515 | 0.469 | 0.810 |
| Total sugars, % |  | 7.7 | 8.9 | 7.3 | 5.9 | 4.8 | 7.7 | information would be obtained from the parent which would generally identify food preferences or aversions as well as eating habits of the family of the test infant. Subjects would be randomly assigned to one of the two feeding groups. The test would involve feeding of the infant by the adult parent. The parent would record the acceptability and tolerance of the infant toward the baby food including amount offered, amount consumed and amount refused by the babies. All digestive problems, such as vomiting, spitting up, and diarrhea would be noted. Acceptability would be scored by the mothers in a questionnaire which uses a nine-point hedonic scale as illustrated in Example 9 above (see also Stone and Sidel, Sensory Evaluation Practices, Academic Press, Inc., Orlando, 1985, pp. 58–86 which is incorporated by reference). The mothers would indicate acceptance or aversion based on the responses of the infants to the food. The results would then be analyzed and egg-yolk compositions showing acceptance comparable to or greater than that of standard baby food would be considered suitable for use as an infant food.

EXAMPLE 14

This example illustrates an egg yolk containing composition of peaches, oatmeal and cinnamon in which the acidulant is comprised of an acidic fruit component of peach puree and white grape juice along with ascorbic acid.

This study, identified as PP6300, was a pilot plant scale up of an earlier Test Kitchen sample, TK341C. TK341C was evaluated by a panel of five (5) tasters and found to have an acceptable taste.

Single-strength peach puree, 82.5 lb., was added to a kettle equipped with a swept-surface heating capability. The puree was heated to a temperature of 160° F. to 170° F. using the hot water jacket. Fifty-five (55) pounds of this hot peach puree were weighed and transferred to a second kettle.

Ferrous sulfate heptahydrate, 0.03 lb. (13.62 g), and citric acid, 0.02 lb. (9.08 grams), were dissolved in a portion of the batch water to form a complex of ferrous iron and citric acid. Seven pounds of white grape juice concentrate, 6.67 lb. of dried egg-yolk powder, 2.0 lb. of oat flakes, 0.04 lb. of ascorbic acid, 0.45 lb. of ground cinnamon, 0.02 lb. (9.08 g) of vitamin premix and 0.011 lb. (5.0 g) of zinc sulfate were added to 18.07 lb. of batch water in the second kettle containing 55 pounds of peach puree and made into a slurry with the hot peach puree. The ferrous sulfate-citric acid solution was added and mixing was continued.

The slurry was passed through a Stephan Microcutter, Model No. MC-12, equipped with a blank ring and transferred to a Koven kettle. After additional mixing, the pH was measured and found to be pH 4.04. The peach puree and white grape juice concentrate contributed sufficient acidity so that addition of a specific acidulant was unnecessary. The slurry was heated to a temperature of 180° F. to 190° F. by steam injection, adding about 10 lb. of water to the batch via condensation. The slurry was passed twice through a Stephan Microcutter, Model No. MC-12, equipped with a 0.05–0.10 mm ring and strained through a 0.033" screen.

The product was filled into 113-gram glass jars at a temperature of 150° F. The jars were then capped and thermally processed in a retort at 212° F. for 30 minutes to achieve pasteurization in accordance with 21 C.F.R. §114 et seq. "Acidified Foods." The pH of PP6300 on the day after processing was 4.34.

EXAMPLE 15

This example illustrates pilot plant production of an egg yolk containing chicken lasagna composition (PP6627) in which the acidulant is comprised of tomato puree.

Water was heated in an open kettle to 200° F. and 11.25 lb. of mafalda pasta was blanched therein for 10 minutes to achieve hydration. The blanched pasta was then drained and rinsed with cold water. The weight of the blanched pasta was 26.65 lb.

Forty and one-quarter lb. of frozen carrot pieces were placed in a Fitzpatrick Comminutor, Model No. D, at medium speed and an exit temperature of 180° F. to 200° F. (190° F. target). Approximately 6 lb. of water were added through steam injection, resulting in a total puree weight of 47 lb. The spinning knives in the Comminutor and the injected steam comminuted the carrots into a puree that passes through a 3/16" or 1/4" screens.

Thirty-five pounds of tomato paste, 26.65 lb. of blanched mafalda pasta, 20.12 lb. of carrot puree, 17.88 lb. of finely ground chicken, 16.68 lb. of dried egg-yolk powder, and 12.5 lb. of grated Romano cheese were added to 91.17 lb. of batch water in a kettle and mixed into a slurry.

The slurry was passed through a Stephan Microcutter, Model No. MC-12, equipped with a blank ring and transferred to a Koven kettle. After additional mixing, the pH was measured and found to be pH 5.0 due to the acidity contributed by the tomato paste. The slurry was heated to a temperature of 180° F. to 190° F. by steam injection, adding about 30 lb. of water to the batch via condensation. The slurry was passed twice through a Stephan Microcutter, Model No. MC-12 equipped with a 0.05–0.10 mm ring and strained through a 0.033" screen.

The product was filled into 113-gram glass jars at a temperature of 170° F. The jars were then capped and thermally processed in a retort at 250° F. for 45 minutes as required by 21 C.F.R. §113 et seq. "Thermally Processed Low-Acid Foods Packaged in Hermetically Sealed Containers." The pH of PP6627 on the day after processing was 4.96.

PP6627 was evaluated by a trained individual for flavor on a nine-point scale. A score of "5" means "I neither like nor dislike" and a score of "6" means "I like slightly." PP6627 was given a score of "6" on this flavor scale.

EXAMPLE 16

This example illustrates pilot plant production of an egg yolk containing pear berry medley composition (PP6331) in which the acidulant is comprised of pear puree, white grape juice, red raspberry puree, elderberry juice concentrate and ascorbic acid.

This study was a pilot plant scale up of an earlier Test Kitchen sample, TK337C. TK337C was evaluated by a panel of five (5) tasters and found to have a highly acceptable taste by all five tasters.

Single-strength pear puree, 125 lb., was added to a kettle equipped with a swept-surface heating capability. The puree was heated to a temperature of 160° F. to 170° F. using the hot water jacket. One hundred and eleven pounds of this hot pear puree were weighed and transferred to a second kettle.

Twenty-five pounds of white grape juice concentrate, 16.68 lb. of dried egg-yolk powder, 20.0 lb. of red raspberry puree, 14.0 lb. of heavy cream, 12.5 lb. of full-fat yogurt, 8.75 lb. of medium grain rice flour, 7.5 lb. of fresh whole milk, 3.75 lb. of elderberry juice concentrate, 0.1 lb. of ascorbic acid, 0.0275 lb. of zinc sulfate were added to the pear puree and 13.2 lb. of batch water in the second kettle and mixed into a slurry.

The slurry was passed through a Stephan Microcutter, Model No. MC-12, equipped with a blank ring and transferred to a Koven kettle. After additional mixing, the pH was measured and found to be pH 4.14. The acidic nature of the peach puree and white grape juice concentrate created sufficient acidity so that addition of a specific acidulant was unnecessary. The slurry was heated to a temperature of 180° F. to 190° F. by steam injection, adding about 17.5 lb. of water to the batch via condensation. The slurry was passed twice through a Stephan Microcutter, Model No. MC-12, equipped with a 0.05–0.10 mm ring and strained through a 0.033" screen.

The product was filled into 113-gram glass jars at a temperature of 150° F. The jars were then capped and thermally processed in a retort at 212° F. for 30 minutes to achieve pasteurization in accordance with 21 C.F.R. §114 et seq. "Acidified Foods." The pH of PP6331 on the day after processing was 4.08.

All references cited in this specification are hereby incorporated by reference. The discussion of the references herein is intended merely to summarize the assertions made by their authors and no admission is made that any reference constitutes prior art. Applicants reserve the right to challenge the accuracy and pertinency of the cited references.

In view of the above, it will be seen that the several advantages of the invention are achieved and other advantageous results attained.

As various changes could be made in the above methods and compositions without departing from the scope of the invention, it is intended that all matter contained in the above description shall be interpreted as illustrative and not in a limiting sense.

What is claimed is:

1. A baby-food composition comprising from about 5% to about 25% coagulated egg-yolk solids (grams/100 grams) and an acidulant in an acceptable, shelf-stable baby-food preparation for which Appearance/Color, Flavor, and Mouthfeel/Texture scores on a nine-point hedonic scale are each greater than five, wherein the acidulant comprises an acid, a cultured food substance containing lactic acid, or a fruit of vegetable component which contributes acidity to the composition.

2. The baby-food composition according to claim 1 wherein the fruit or vegetable component comprises a puree or juice of apples, pears, pineapples, strawberries, raspberries, elderberries, blueberries, cherries, grapes, peaches, plums, apricots, lemons, clementines, grapefruits, oranges, tomatoes, rhubarbs, sorrels, cress or a combination thereof.

3. The baby-food composition according to claim 1 wherein the acid comprises citric acid, ascorbic acid, phosphoric acid, vinegar or a combination thereof.

4. The baby-food composition according to claim 1 wherein the cultured food substance containing lactic acid is selected from the group consisting of yogurt, sour cream, cottage cheese, sauerkraut and a combination thereof.

5. The baby-food composition according to claim 1, which has a pH of about 5.0 or less.

6. The baby-food composition according to claim 5, which has a pH of about 4.6 or less.

7. The baby-food composition according to claim 1, which comprises from about 5% to about 10% coagulated egg-yolk solids (grams/100 grams).

8. The baby-food composition according to claim 7, which comprises about 6.7% coagulated egg-yolk solids (grams/100 grams).

9. The baby-food composition according to claim 8 further comprising a zinc salt, a spice, a filler substance or a combination thereof.

10. The baby-food composition according to claim 9 comprising about 6.7% coagulated egg-yolk solids (grams/100 grams), about 55% peach puree (grams/100 grams), about 7% white grape juice (grams/100 grams), about 2% oat flakes (grams/100 grams), about 0.04% ascorbic acid (grams/100 grams), about 0.45% cinnamon (grams/100 grams) and about 0.011% zinc sulfate (grams/100 grams).

11. The baby-food composition according to claim 9 comprising about 6.7% coagulated egg-yolk solids (grams/100 grams), about 14% tomato paste (grams/100 grams), about 11% blanched pasta (grams/100 grams), about 8% carrot puree (grams/100 grams), about 7% ground chicken (grams/100 grams), and about 5% grated cheese (grams/100 grams).

12. The baby-food composition according to claim 9 comprising about 6.7% coagulated egg-yolk solids (grams/100 grams), about 44% pear puree (grams/100 grams), about 10% white grape juice (grams/100 grams), about 8% raspberry puree (grams/100 grams), about 5.6% cream (grams/100 grams), about 5% yogurt (grams/100 grams), about 3.5% rice flour (grams/100 grams), about 3% milk (grams/100 grams), about 1.5% elderberry juice concentrate (grams/100 grams), about 0.04% ascorbic acid (grams/100 grams), about 0.011% zinc sulfate (grams/100 grams).

13. A method for preparing a baby-food composition containing egg yolk, the method comprising combining about 5% to about 25% coagulated egg-yolk solids (grams/100 grams), an aqueous liquid, and an acidulant in an acceptable, shelf-stable baby-food preparation for which Appearance/Color, Flavor, and Mouthfeel/Texture scores on a nine-point hedonic scale are each greater than five, wherein the acidulant comprises an acid, a cultured food substance containing lactic acid, or a fruit of vegetable component which contributes acidity to the composition.

14. The method according to claim 13 wherein the fruit or vegetable component comprises a puree or juice of apples, pears, pineapples, strawberries, raspberries, elderberries, blueberries, cherries, grapes, peaches, plums, apricots, lemons, clementines, grapefruits, oranges, tomatoes, rhubarbs, sorrels, cress or a combination thereof.

15. The method according to claim 13 wherein the acid comprises citric acid, ascorbic acid, phosphoric acid, vinegar or a combination thereof.

16. The method according to claim 13 wherein the cultured food substance containing lactic acid is selected from the group consisting of yogurt, sour cream, cottage cheese, sauerkraut and a combination thereof.

17. The method according to claim 13, wherein the composition has a pH of about 5.0 or less.

18. The method according to claim 17, wherein the composition has a pH of about 4.6 or less.

19. The method according to claim 13, wherein the composition comprises from about 5% to about 10% coagulated egg-yolk solids (grams/100 grams).

20. The method according to claim 19, wherein the composition which comprises about 6.7% coagulated egg-yolk solids (grams/100 grams).

21. The method according to claim 13 wherein combining about 5% to about 25% egg-yolk solids (grams/100 grams), an aqueous liquid, and an acidulant comprises combining about 5% to about 25% egg-yolk solids (grams/100 grams) and a fruit juice which contributes water and acidity to the composition.

22. The method according to claim 20 further comprising adding a zinc salt, a spice, a filler substance or a combination thereof.

23. The method according to claim 22 comprising combining about 6.7% coagulated egg-yolk solids (grams/100 grams), about 55% peach puree (grams/100 grams), about 7% white grape juice (grams/100 grams), about 2% oat flakes (grams/100 grams), about 0.04% ascorbic acid (grams/100 grams), about 0.45% cinnamon (grams/100 grams) and about 0.011% zinc sulfate (grams/100 grams).

24. The method according to claim 22 comprising combining about 6.7% coagulated egg-yolk solids (grams/100 grams), about 14% tomato paste (grams/100 grams), about 11% blanched pasta (grams/100 grams), about 8% carrot puree (grams/100 grams), about 7% ground chicken (grams/100 grams), and about 5% grated cheese (grams/100 grams).

25. The method according to claim 22 comprising combining about 6.7% coagulated egg-yolk solids (grams/100 grams), about 44% pear puree (grams/100 grams), about 10% white grape juice (grams/100 grams), about 8% raspberry puree (grams/100 grams), about 5.6% cream (grams/100 grams), about 5% yogurt (grams/100 grams), about 3.5% rice flour (grams/100 grams), about 3% milk (grams/100 grams), about 1.5% elderberry juice concentrate (grams/100 grams), about 0.04% ascorbic acid (grams/100 grams), about 0.011% zinc sulfate (grams/100 grams).

* * * * *